United States Patent [19]
Erickson et al.

[11] Patent Number: 5,870,935
[45] Date of Patent: Feb. 16, 1999

[54] SELF-LOCKING CLAMPING APPARATUS FOR COUPLING A TOOL UNIT TO A TOOL SUPPORTER

[75] Inventors: Robert A. Erickson, Raleigh, N.C.; Horst M. Jäger, Nürnberg, Germany

[73] Assignee: Kennametal Inc., Latrobe, Pa.

[21] Appl. No.: 725,388

[22] Filed: Oct. 3, 1996

Related U.S. Application Data

[63] Continuation-in-part of Ser. No. 406,088, Mar. 17, 1995.

[51] Int. Cl.⁶ ..................................................... B23B 29/04
[52] U.S. Cl. .................................. 82/160; 82/36; 82/234; 279/2.11; 408/239 R
[58] Field of Search ................................... 279/2.11, 2.23, 279/4.12, 57, 75; 82/160, 158; 408/240, 239, 239 R

[56] References Cited

U.S. PATENT DOCUMENTS

| | | | |
|---|---|---|---|
| 4,708,040 | 11/1987 | Erickson | 82/160 |
| 4,736,659 | 4/1988 | Erickson | 82/36 |
| 4,747,735 | 5/1988 | Erickson et al. | 409/234 |
| 4,836,068 | 6/1989 | Erickson | 82/160 |
| 4,863,323 | 9/1989 | Glaser | 279/2.11 |
| 4,932,295 | 6/1990 | Erickson | 82/160 |
| 5,173,017 | 12/1992 | Oshnock et al. | 82/160 |
| 5,415,066 | 5/1995 | Erickson et al. | 82/160 |
| 5,452,631 | 9/1995 | Erickson | 82/160 |
| 5,662,442 | 9/1997 | Taki et al. | 408/239 R |

Primary Examiner—Andrea L. Pitts
Assistant Examiner—Mark Williams
Attorney, Agent, or Firm—John M. Vasuta

[57] ABSTRACT

A self-locking clamping apparatus is provided for coupling a tool unit to a tool supporter. The clamping apparatus includes a pair of locking spheres, a canister member that is matable with the tool unit and which includes a pair of opposing apertures for admitting the locking spheres, and a lock rod reciprocally movable within the canister member along an axis and having opposing ramp portions for radially moving the locking spheres through the canister apertures into locking engagement with the tool unit. The ramp portions are inclined at a small angle of approximately 5° with respect to the axis of movement of the lock rod to render the lock rod self-locking as a result of stiction between the surfaces of the ramp portions and the locking spheres. The small angle of the ramp portions allows the use of a small, lightweight pneumatic actuator which may be powered by shop air. Finally, a biasing mechanism in the form of one or more coil springs prevents the lock rod from being shaken out of a locked position from externally applied vibration.

18 Claims, 5 Drawing Sheets

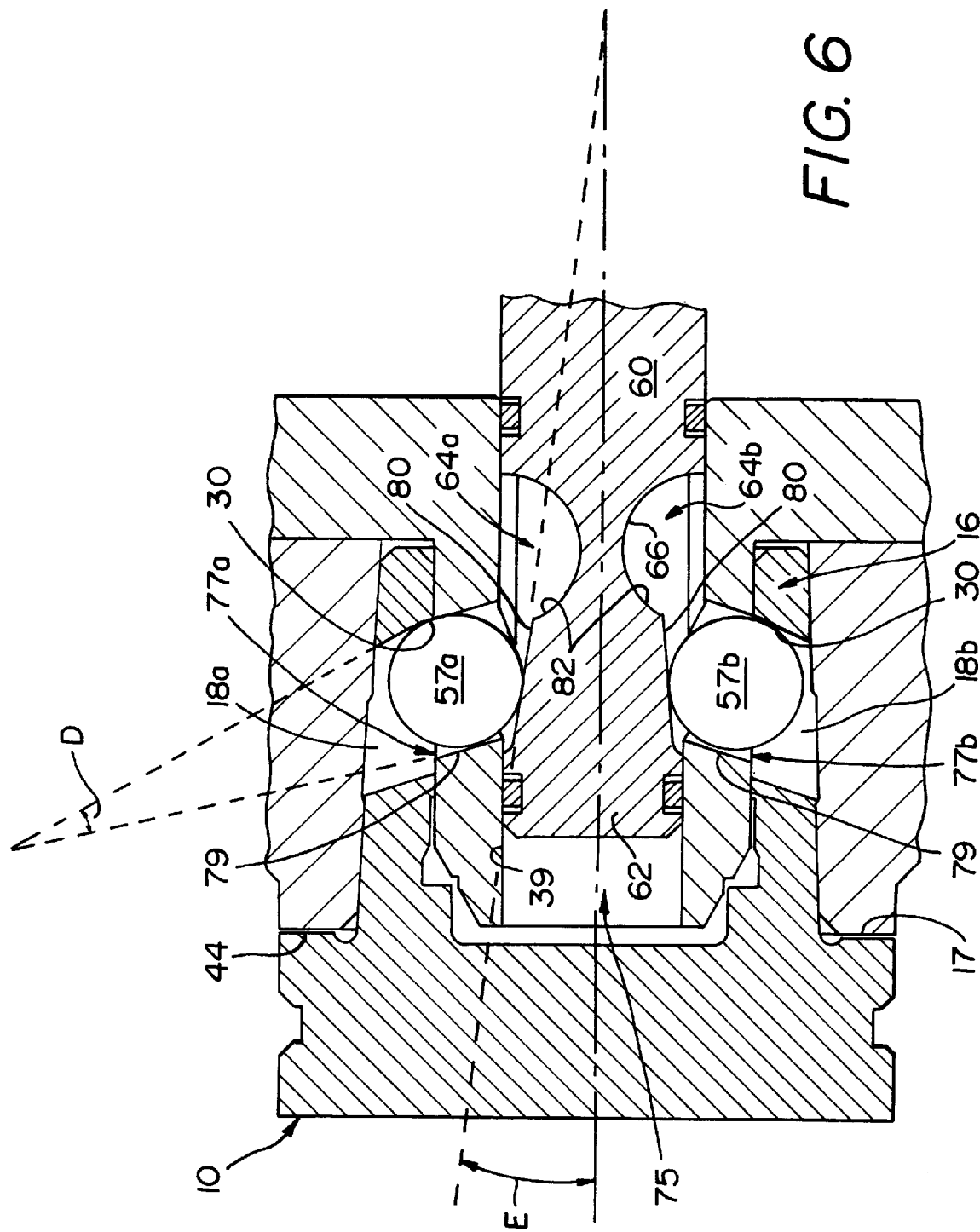

SELF-LOCKING CLAMPING APPARATUS FOR COUPLING A TOOL UNIT TO A TOOL SUPPORTER

This application is a continuation-in-part of U.S. patent application Ser. No. 08/406,088, filed Mar. 17, 1995.

BACKGROUND OF THE INVENTION

This invention generally relates to an improved lock rod clamping apparatus for detachably connecting a tool unit to a tool supporter, and is particularly concerned with such an apparatus having a self-locking lock rod that can be pulled into a locking position by -means of a low pressure, pneumatic actuator. The lock rod may further include recesses adjacent to its ramp portions for receiving one or more locking spheres.

Clamping mechanisms for detachably connecting a tool unit to a tool supporter are well known in the prior art. Such mechanisms are typically used in machining operations where the tool unit holds a cutting insert that is moved into and out of cutting engagement with a rotating workpiece. The clamping apparatus allows different tool units holding different cutting inserts to be quickly attached to and detached from the tool supporter which in turn is connected to a lathe or other device, that controls the movement of the tool unit with respect to the workpiece.

One of the commercial clamping mechanisms includes a cylindrically-shaped canister member that is matable with the tubular end of a tool unit and which includes apertures for admitting locking elements into locking engagement with recesses present in the tool unit. The locking elements, which are typically spherical, are radially moved through the apertures in the canister member by means of a reciprocating lock rod having cams that engage the locking elements. Examples of such clamping mechanisms are disclosed in U.S. Pat. Nos. 4,708,040; 4,747,735; 4,836,068, and 4,932,295, each of which is assigned or co-assigned to Kennametal Inc., located in Latrobe, Pa.

A side, cross-sectional view of such a prior art clamping mechanism 35 is illustrated in FIGS. 3 and 4. Such a mechanism 35 includes a cylindrically-shaped canister member 39 mounted within a housing 41 formed from a coupling member 43. The canister member 39 includes a pair of opposing apertures 54a,b in the form of cylindrical bores through the tubular wall of the member 39. The walls 56 of the apertures 54a,b, are orthogonal with respect to the axis A of reciprocation of the lock rod 60. The inner diameter of the cylindrical bores forming the apertures 54a,b closely approximates the outer diameter of spherical locking elements 57a,b. The reciprocating lock rod 60 includes a distal end 62 that is slidably mounted within the cylindrical interior of the canister member 39. The distal end 62 of the lock rod 60 includes cams 64a,b which include spherical depressions 66 that taper off into ramp portions 68. The proximal end 69 of the lock rod 60 is connected to an actuator 73 formed from a stack of Bellville washers 74 that are slidably and concentrically disposed around the proximal end 72.5 of the canister member 39. These springs 74 are captured between support plate 45 and a spring retainer 73.5 connected to the proximal end 69 of the lock rod, and provide a pulling force that draws the lock rod 60 into the position shown in phantom. In this position, the ramp portions 68 of the cams 64a,b radially push the locking spheres 57a,b through the cylindrical apertures 54a,b in the canister member 39 and into engagement with angled wall portions 30 present in the frustro-conically shaped tool unit 10. This engagement lockingly secures the tool unit 10 to the tool supporter 37.

While such a prior art locking mechanism has proven its capability of quickly, conveniently, and rigidly attaching a tool unit to a tool supporter, the applicant has observed several areas where the performance of such a mechanism may be improved. Specifically, the applicant has observed that if the clamping mechanism could be modified to render the lock rod self-locking, then the need for any kind of device for continuously applying a large pull-back force on the rod to maintain it in a locked position could be eliminated. Presently, this pull-back force is provided by spring-type actuators such as Bellville washers, or hydraulic cylinder-type actuators. Such actuators serve not only to draw the lock rod into the position illustrated in FIG. 4, but to maintain the lock rod in such a position until it is desired to disengage the clamping mechanism from the tool unit.

The applicant has also observed that if the amount of pull-back force necessary to pull the lock rod into a locking position (which may be about 2000 pounds) could be lowered, then the spring-type or hydraulic actuators used in the prior art could be replaced with a smaller and lighter pneumatic cylinder. Such a pneumatic cylinder could advantageously be powered by the 80 psi compressed air available in virtually all machine shops.

It would further be advantageous if the resulting gripping force could be increased, thereby also increasing tool rigidity and cutting accuracy.

Finally, it would be advantageous if all of these objects could be achieved with only a minimal amount of modification to the shapes of existing parts so that a conventional clamping mechanism of the type previously described could easily be converted into such a clamping mechanism.

SUMMARY OF THE INVENTION

The invention is a self-locking clamping apparatus for coupling a tool unit to a tool supporter that fulfills all of the aforementioned criteria, and requires only a relatively small amount of pull-back force in order to self-lock. The apparatus comprises at least one locking element that is preferably spherical, a canister member that is matable with a tool unit and which includes an aperture for admitting the locking element, and a lock rod reciprocally movable within the canister member a stroke distance along an axis and having a ramp portion for moving the locking sphere through the canister aperture into locking engagement with the tool unit. To insure the self-locking ability of the apparatus, the ramp portion of the lock rod is inclined at a sufficiently small angle with respect to the axis of movement so that the lock rod becomes self-locking as a result of stiction between its ramp portion and a locking sphere when the rod is pulled into a locking position.

The clamping apparatus may also comprise an actuator connected to an end of the lock rod for pulling the lock rod into a locked position. In the preferred embodiment, since the angle of the ramp portion of the lock rod is so small, the amount of pull-back force that the actuator must apply to the lock rod is relatively small. Based upon a range of different sizes of the clamping apparatus, the pull-back face may range from approximately 350 to 1100 pounds. Consequently, the actuator may take the form of a relatively small and lightweight pneumatic piston and cylinder.

To insure that the lock rod stays in a locking position when exposed to external vibration, the apparatus may further include a biasing means, such as a compression spring for biasing the lock rod into a locked position.

Because of the relatively high magnitude of the stiction forces present between the locking spheres and the ramp portion of the lock rod, the biasing mechanism that serves to prevent the lock rod from being vibrated out of a locked position need only exert only about 4% to 8% of the pulling force generated by the rod actuator, or between about 25 to 50 pounds.

Finally, in order to increase the clamping force between the tool supporter and the tool unit, the walls that define the canister apertures are inclined between about 10° and 20° with respect to a line orthogonal to the axis of reciprocation of the lock rod. Such an inclination causes the locking spheres to engage the aperture walls of the tool unit at a smaller angle, thereby not only increasing the clamping force between the tool unit and clamping mechanism, but the rigidity of the resulting coupling. Such increased rigidity advantageously leads to a more accurate cutting action.

Because of the small angle of the ramp portions of the lock rod, the spring-type biasing mechanism, the tangent angle portions of the lock rod, and the angled walls of the canister apertures, the clamping apparatus of the invention is capable of securely coupling a tool unit to a tool supporter in a self-locking manner with only a moderate amount of lock rod stroke and with a nominal amount of force, such as, for example, that provided by a piston using 80 psi from shop air.

BRIEF DESCRIPTION OF THE SEVERAL FIGURES

FIG. 6 is an enlarged, cross-sectional view of the clamping mechanism of the invention connecting a tool unit to a tool supporter, illustrating in particular how the smaller angle of the ramp portions of the lock rod cam permits the lowering of the pull back force and a self-locking feature of the lock rod.

DETAILED DESCRIPTION OF THE PREFERRED EMBODIMENT

Figure 1:
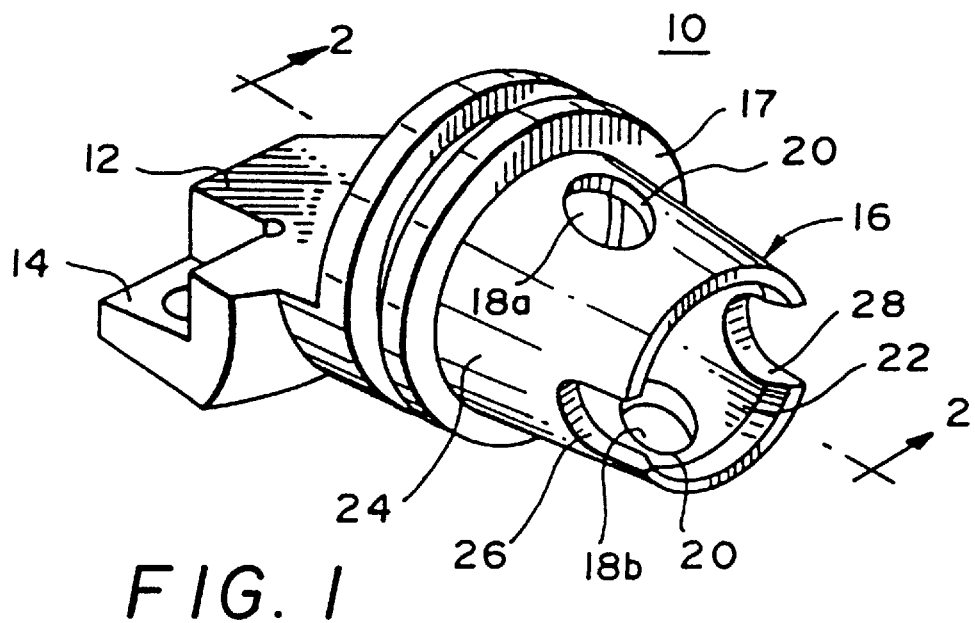
FIG. 1 is a perspective view of a tool unit of the type secured by the clamping mechanism of the invention.
Figure 2:
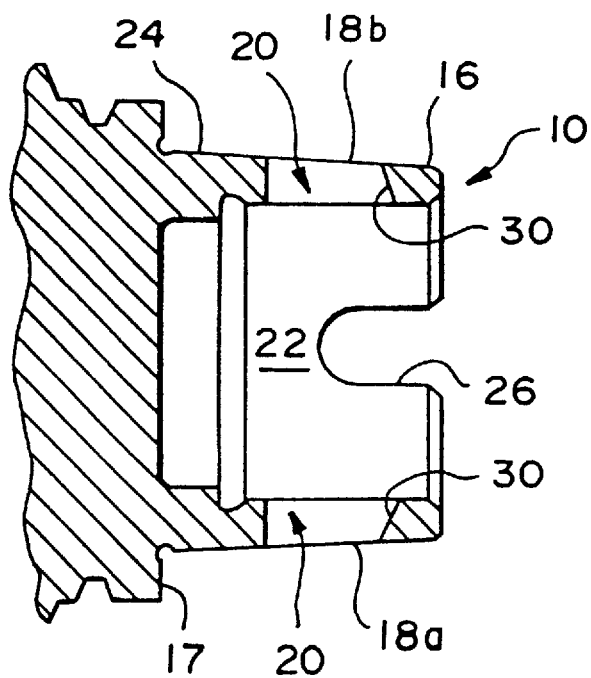
FIG. 2 is a cross-sectional side view of a portion of the tool unit illustrated in FIG. 1 along the line 2—2.

With reference now to FIGS. 1 and 2, the tool unit 10 used in conjunction with the clamping mechanism of the invention has a forward end 12 for holding a cutting tool, and rearward tubular shank 16 for connection to a tool supporter. The forward end 12 includes a recess or pocket 14 which is conventional in design for receiving an indexable cutting insert. At the junction between the forward end 12 and the tubular shank 16 is an annular abutment face 17. Face 17 engages the annular face of a tool supporter when the tool unit is connected to such a supporter by way of a clamping mechanism. The abutment face 17 is planar and is orthogonally oriented with respect to the longitudinal axis of the tubular shank 16.

As is indicated in FIG. 2, the tubular shank 16 is preferably integrally formed with the forward end 12 of the tool unit 10 from a single piece of steel. The shank 16 has a pair of opposing opening 18a,b for receiving the spherical locking elements of the clamping mechanism. The walls 20 of the openings 18a,b are not cylindrical completely around their circumference, but instead include angled wall portions 30 for facilitating a locking engagement between the shank 16 and the spherical elements of the clamping mechanism. The inner surface 22 of the tubular shank 16 is substantially cylindrical in shape so as to closely mate with the outer surface of the canister member of the clamping mechanism which will be described shortly. The shank outer surface 24 is frustro-conical in shape for the purposes of both centering and rigidly connecting the tool unit 10 and a tool supporter. Disposed orthogonally with respect to the opposing openings 18a,b are alignment slots 26 and 28. These slots 26,28 fit into protruding keys (not shown) present in the canister member 39 of the clamping mechanism to insure alignment between the openings 18a,b with the spherical locking elements of the clamping mechanism.

Figure 3:
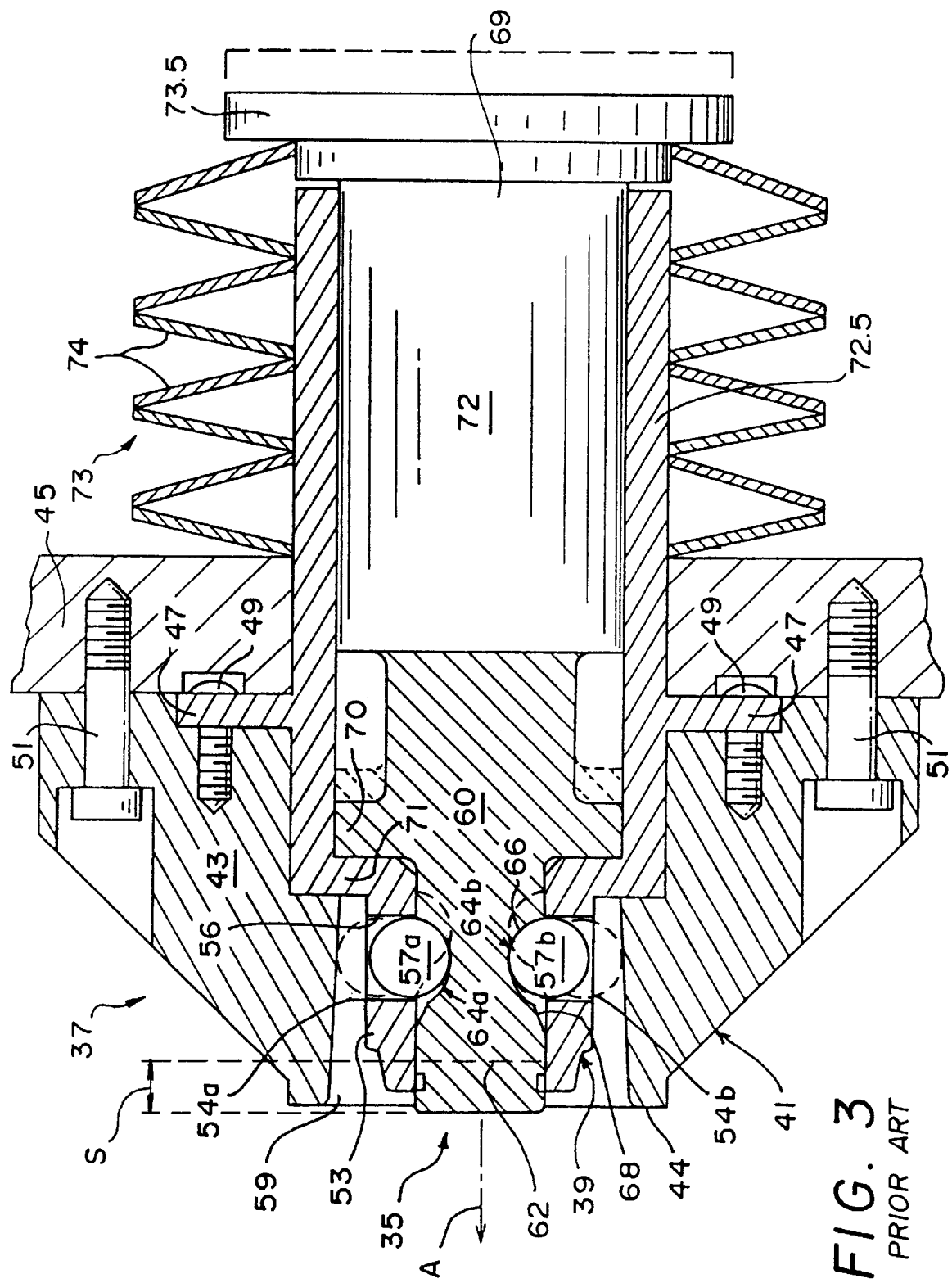
FIG. 3 is a cross-sectional side view of a prior art clamping mechanism that detachably connects the tool unit of FIGS. 1 and 2 to a tool supporter.
Figure 4:
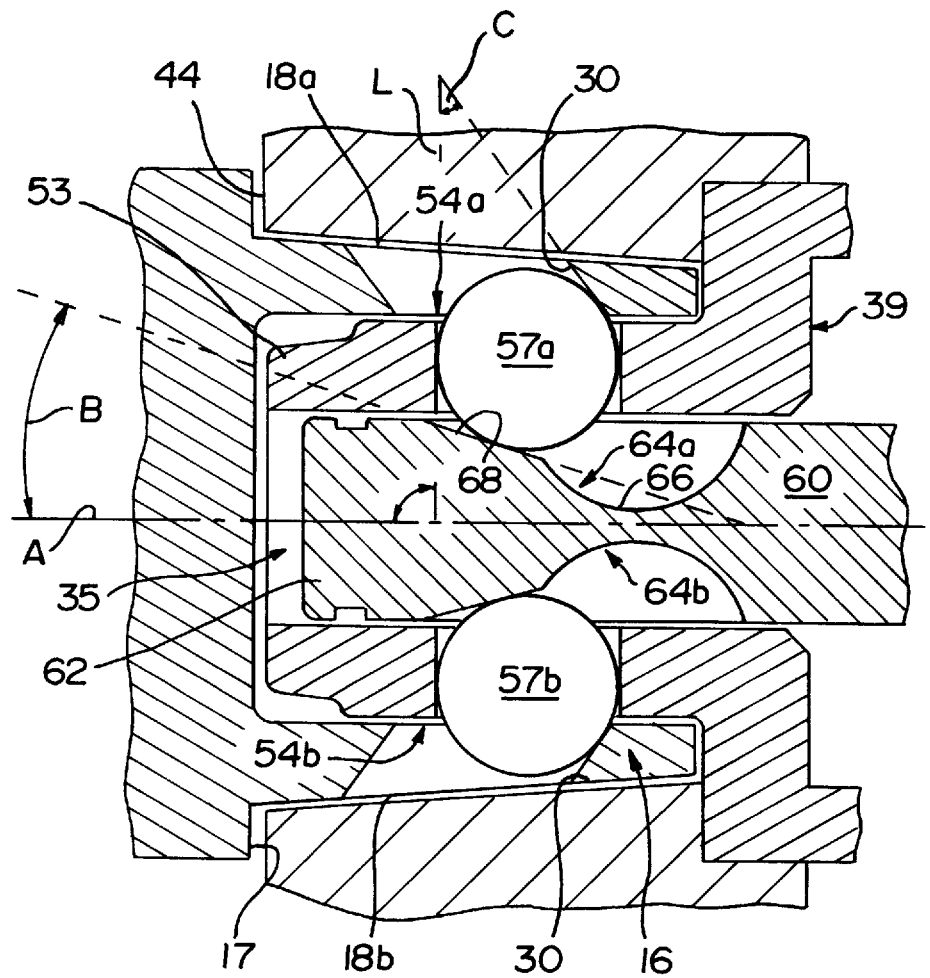
FIG. 4 is an enlarged cross-sectional side view of the prior art clamping mechanism illustrated in FIG. 3 as it would appear connecting a tool unit to a tool supporter.

FIGS. 3 and 4 illustrate the previously described prior art clamping mechanism 35 that is disposed within a tool supporter 37 as shown. This clamping mechanism includes a cylindrically shaped canister member 39 mounted within a housing 41 formed from a coupling member 43. The coupling member 43 terminates, at its distal end, in an annular abutment face 44 that mates flush with the previously discussed abutment face 17 of the tool unit 10. The tool supporter housing 37 further has a support plate 45 disposed behind the coupling member 43. The canister member 39 is affixed to the housing 41 by way of an annular flange 47 secured to the coupling member 43 by bolts 49. Coupling member 43 is in turn secured to the support plate 45 by means of bolts 51. Thus the canister member 39 remains stationary relative to the lock rod 60 as the rod 60 reciprocally slides within the interior of the member 39 to move the locking spheres into locked and unlocked positions. As is evident in FIG. 3, the internal diameter of the canister member 39 is complementary to the external diameter of the lock rod 60 at its distal and proximal ends so that these two components closely interfit.

When the actuator 73 of the prior art clamping mechanism 35 is released to allow the Bellville washers 74 to expand and withdraw the lock rod 60, the locking spheres 57a,b ride up the left hand sides of the semi-spherical recesses 66 of the cams 64a,b and on to the ramp portions 68. The ramp portions 68 radially push the locking spheres 57a,b through the cylindrically-shaped apertures 54a,b into engagement with the angled portions 30 of the tool unit apertures 20.

While such prior art clamping mechanisms 35 have proven capable of rigidly and securely attaching a tool unit 10 to a tool supporter 37, the applicant has observed that the stack of Bellville washers 74 must constantly apply their relatively large pull-back force, which is on the order of 2,000 pounds, to the lock rod 60 for the locking spheres 57a,b to remain in such a locking position. In other words, if the pull-back force applied by the Bellville washers 74 was removed, the reactive forces that the locking spheres 57a,b apply to the ramp portions 68 on the rod 60 would force the rod 60 forward into a non-engagement position thereby detaching the tool unit 10 and the tool supporter 37. Additionally, the applicant has observed that if the angle of engagement (shown in FIG. 4) between the angled wall portion 30 of the tool unit 10 and the locking spheres 57a,b could be made smaller, the gripping force between the clamping mechanism 35 and the tool unit 10 could be increased, thereby resulting in a more rigid connection and hence more accurate machining operations.

Figure 5:
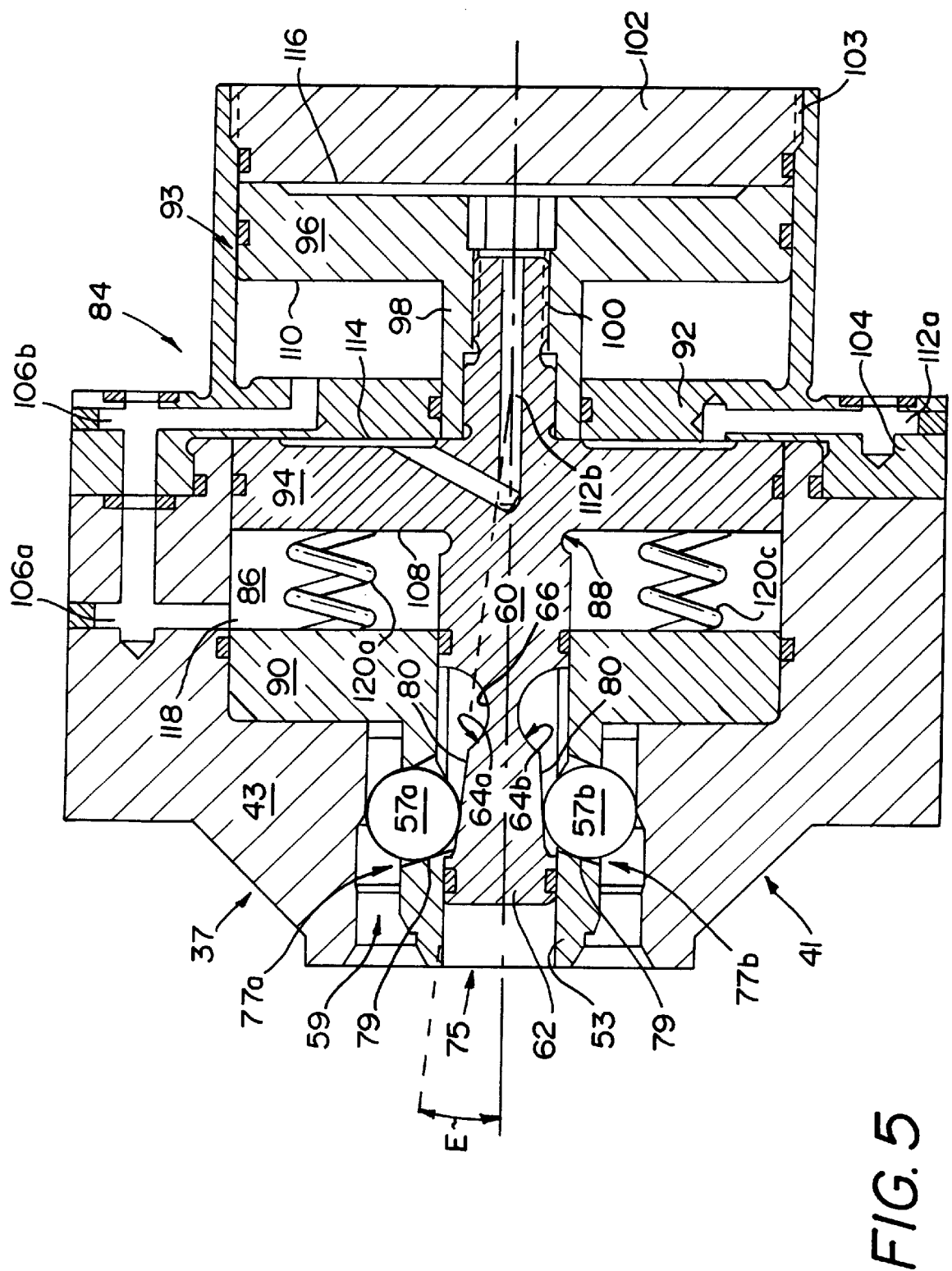
FIG. 5 is a cross-sectional side view of the clamping mechanism of the invention.

The clamping mechanism 75 of the invention overcomes all the aforementioned shortcomings associated with the prior art clamping mechanism 35. With reference now to FIGS. 5 and 6, the clamping mechanism 75 of the invention includes angled apertures 77a,b in the canister member 39, each of which has angled walls 79 which form a smaller angle with respect to the tapered wall portions 30 of the opening 18a,b in the tool unit 10 than the walls of the cylindrical apertures 54a,b used in the prior art. As is described with specificity in parent U.S. application Ser. No. 08/406,088, filed Mar. 17, 1995, such angled walls 79 advantageously increase the gripping force between the tool unit 10 and the clamping mechanism 75 by reducing the angle of engagement D between the wall 77 of the canister member 39, and the angled wall portion 30 of the tool unit. While the use of such angled walls 79 is preferred, the present invention would be fully operative with the type of straight, radially oriented walls that define the apertures 54a,b shown in FIG. 4.

To render the lock rod 60 self-locking, the ramp portions 80 of the cams 64a,b on the distal end 62 of the rod 60 are inclined at an angle E between 3° and 8°, and most preferably 5°. Such angling not only renders the lock rod 60 self-locking due to stiction-type reaction forces between the locking spheres 57a,b and the ramp portions 80, but also reduces the required amount of pull back force.

With specific reference again to FIG. 5, the clamping mechanism 75 of the invention advantageously utilizes a pneumatic actuator 84 which may be smaller than the spring-operated actuator 73 shown in FIG. 3. Actuator 84 includes a cylindrical cavity 86 present in the coupling member 43, and a tandemly oriented cylinder assembly 88. The cylindrical cavity 86 is defined at its distal end by an annular flange 90 that extends around the proximal end of the canister member 39, and at its proximal end by a distal annular wall 92 of the cylindrical housing 93 of the cylinder assembly 88. The pneumatic actuator 84 further comprises interconnected distal and proximal pistons 94,96. Distal piston 94 is reciprocally movable within the cylindrical cavity 86 and proximal piston 96 is reciprocally movable within the cylindrical housing 93 of the actuator 84. The distal piston 94 is integrally formed around a mid section of the lock rod 60, while the proximal piston 96 is attached to a threaded proximal end 100 of the lock rod 60 via a screw fitting 98. A proximal annular wall 102 forms the proximal end of the cylindrical housing 93 of the actuator 84. This wall 102 is secured around the inner edge of the cylindrical walls of the housing 93 by means of screw threads 103.

The cylindrical housing 93 is attached around the proximal end of the coupling member 43 by means of a coupling flange 104 that is integrally formed around the distal annular wall 92. Bolts (not shown) may be used for this purpose. Coupling flange 104 includes pneumatic actuation inlets 106a,b for admitting compressed air simultaneously to the front face 108 of the distal piston 94 and the front face 110 of the proximal piston 106. Coupling flange 104 further includes deactuation inlets 112a,b for simultaneously conducting compressed air to the rear face 114 of the distal piston 94 and the rear face 116 of the distal piston 96. A spring biasing mechanism 118 continuously applies a small pull back force onto the lock rod 60 to urge it into a locking position. In the preferred embodiment, the spring biasing mechanism is formed from four coil springs 120a–d (of which only springs 120a and 120c are visible). The total amount of pull back force that the mechanism 118 applies to the lock rod 60 need only be on the order of 25 to 50 pounds to prevent the lock rod 60 from being shaken from a locking position by externally applied vibrations from machining operations or the like.

In operation, shop air having a pressure of approximately 80 psi may be simultaneously admitted through the actuation inlets 106a,b in order to pull the lock rod 60 into the positions illustrated in FIGS. 5 and 6. The pressure of the shop air against the front faces 108 and 110 of the distal and proximal pistons 94 and 96, depending upon the size of the pistons, generates approximately 350 pounds of pull-back force on the lock rod 60. This is all that is necessary to pull the locking spheres 57a,b into a locked position. When so positioned, the pressurized air may be disconnected from the inlets 106a,b and the lock rod 60 will stay in this locked position due to the previously described stiction forces between the locking spheres 57a,b and the ramp portions 80. Even if the clamping mechanism 60 is subjected to substantial amounts of vibration after the compressed air is uncoupled from the inlets 106a,b, the spring biasing mechanism 118 will prevent the lock rod 60 from sliding forward into an unlocked position. When it is desired to unlock the clamping mechanism from a tool unit 10, pressurized air is initially admitted into the deactuation inlet 112a. Such pressurized air reacts against the rear face 114 of the distal piston 94, pushing it forward into an unlocked position. At the same time, compressed air from the deactuation inlet 112a is conducted via inlet 112b from the back face of the distal piston 94 to the back face 116 of the proximal piston 96. Hence, both of the pistons 94 and 96 operate simultaneously to push the lock rod 60 forward into an unlocking position wherein the locking spheres 57a,b are radially withdrawn out of engagement against the angled wall portions 30 of the tool unit 10.

While this invention has been described with respect to a preferred embodiment, various changes, modifications, and variations will become evident to persons of skill in the art. All such changes, modifications, and variations are included within the scope of this invention, which is limited only by the claims appended hereto.

What is claimed is:

1. A clamping apparatus for detachably connecting a tool unit to a tool supporter, comprising:

at least one locking element;

a canister member that is matable with a tool unit, the canister member having a central axis, and the canister member, including an aperture for admitting the locking element, and a lock rod reciprocally movable within the canister member a stroke distance along the central axis and having a ramp portion for moving the element through the canister aperture into locking engagement with the tool unit, wherein the ramp portion is inclined at an angle of less than 10° with respect to the axis such that the lock rod is self-locking as a result of stiction between the ramp portion and the locking element.

2. The clamping apparatus of claim 1, further comprising an actuator connected to the lock rod for applying an axial force thereto when in an actuated state to move the rod into a locking position where the locking element engages the tool unit in a locking manner.

3. The clamping apparatus of claim 2, further comprising means for biasing the lock rod in the locking position to insure that the lock rod will not release from the locking position as a result of externally applied vibration.

4. The clamping apparatus of claim 2, wherein the actuator includes a pneumatic piston and cylinder that are operative to reciprocally move the lock rod.

5. The clamping apparatus of claim 1, wherein the angle of inclination is less than 8° with respect to the axis.

6. The clamping apparatus of claim 1, wherein the angle of inclination is about 5° with respect to the axis.

7. The clamping apparatus of claim 1, wherein the lock rod further includes a recess adjacent to the ramp portion for receiving the locking element.

8. The clamping apparatus of claim 7, wherein the recess is complementary in shape to the locking element.

9. The clamping apparatus of claim 8, wherein the locking element is spherical, and wherein the ramp portion has a length that is between about one-half to one diameter of the element.

10. A clamping apparatus for detachably connecting a tool unit to a tool supporter, comprising:

at least one locking sphere;

a canister member that is matable with a tool unit, the canister member having a central axis, and the canister member including an aperture for admitting the locking sphere, and a lock rod reciprocally movable within the canister member a stroke distance along the central axis, the rod having a ramp portion for radially moving the locking sphere through the canister aperture into locking engagement with the tool unit when the rod is in the locking position, the ramp portion being inclined at an angle of less than 10° with respect to the axis so that the lock rod is self-locking as a result of stiction between the rod and sphere when the rod is in the locking position.

11. The clamping apparatus of claim 10, further comprising means for biasing the lock rod in the locking position to insure that the lock rod will not release from the locking position as a result of externally applied vibration.

12. The clamping apparatus of claim 11, further comprising an actuator connected to the lock rod for applying an axial force thereto when in an actuated state to move the rod into a locking position where the locking element lockingly engages the tool unit.

13. The clamping apparatus of claim 12, wherein the force applied to the lock rod by the means for biasing is less than 10% of the force applied to the lock rod by the actuator means when the lock rod is moved into a locking position.

14. The clamping apparatus of claim 12, wherein the actuator means includes a pneumatic piston and cylinder that are operative to reciprocally move the lock rod.

15. The clamping apparatus of claim 10, wherein the angle of inclination is about 5° with respect to the axis.

16. The clamping apparatus of claim 10, wherein the lock rod further includes a recess adjacent to the ramp portion for receiving the locking sphere.

17. The clamping apparatus of claim 16, wherein the ramp portion has a length that is between about 70% and 90% the diameter of the locking sphere.

18. The clamping apparatus of claim 10, wherein the aperture in the canister has sidewalls that are angled between 10° and 20° with respect to a line orthogonal to the axis.

* * * * *